United States Patent [19]

Schmolke et al.

[11] Patent Number: 4,734,371

[45] Date of Patent: Mar. 29, 1988

[54] SYSTEM FOR INTRODUCING NOXIOUS GAS INTO AN EXPOSURE CHAMBER

[75] Inventors: Wolfgang Schmolke, Munich; Peter Schramel, Ismaning; Herbert Drachenberg, Munich; Wolfgang Kern, Oberschleissheim, all of Fed. Rep. of Germany

[73] Assignee: Gesellschaft für Strahlen- und Umweltforschung mbH, München, Neuherberg, Fed. Rep. of Germany

[21] Appl. No.: 856,369

[22] Filed: Apr. 28, 1986

[30] Foreign Application Priority Data

Apr. 26, 1985 [DE] Fed. Rep. of Germany ....... 3515072

[51] Int. Cl.$^4$ ............................................. C12M 3/00
[52] U.S. Cl. .................... 435/284; 435/287; 435/289; 435/313; 137/606; 222/3
[58] Field of Search .............. 128/201.27, 201.28, 128/203.14, 204.21, 204.22, 204.24; 137/606, 607, 896–898, 551; 222/3; 435/284, 287, 289, 313–315

[56] References Cited

U.S. PATENT DOCUMENTS

| | | | |
|---|---|---|---|
| 3,032,053 | 5/1962 | Ross et al. | 137/111 |
| 3,905,384 | 9/1975 | Berger | 137/606 |
| 4,032,285 | 6/1977 | Rohr et al. | 431/12 |
| 4,262,686 | 4/1981 | Heim et al. | 137/7 |
| 4,342,331 | 8/1982 | Bartholomäus et al. | 137/553 |
| 4,392,514 | 7/1983 | Farley et al. | 137/624.2 |
| 4,576,159 | 3/1986 | Hahn et al. | 128/203.14 |

FOREIGN PATENT DOCUMENTS

| | | | |
|---|---|---|---|
| 147713 | 4/1981 | German Democratic Rep. | 137/606 |
| 615377 | 7/1978 | U.S.S.R. | 137/606 |

Primary Examiner—Samuel Scott
Assistant Examiner—Allen J. Flanigan
Attorney, Agent, or Firm—Spencer & Frank

[57] ABSTRACT

The invention relates to a system for supplying noxious gas into an exposure chamber containing plants which are to be exposed, under controlled conditions over long periods of time, to an atmospheric gas which is given a defined composition by the introduction of the noxious gas or gases comprising:

a circuit arrangement for controlling the mixing of the atmospheric gas with the noxious gas(es) including a respective mass flow regulator equipped with a subsequently connected shut-off valve provided in the respective gas inlet conduits with the shut-off valves being switched jointly; a premixer stage connected to the gas inlet conduits for homogeneously mixing the atmospheric and noxious gases; a buffer reservoir for the thus composed mixture of atmospheric and noxious gases; and a computer controlled dosaging device for the mixture of atmospheric and noxious gases to be introduced into the exposure chamber.

7 Claims, 4 Drawing Figures

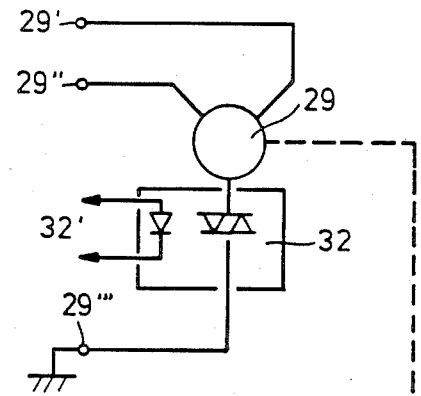
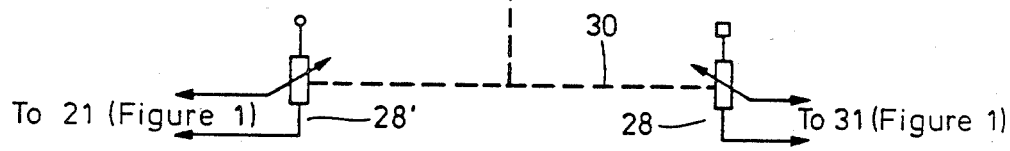
Fig. 3
Fig. 4
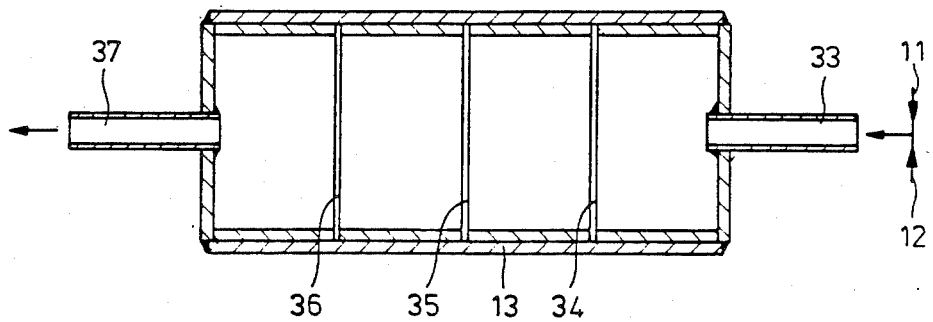

SYSTEM FOR INTRODUCING NOXIOUS GAS INTO AN EXPOSURE CHAMBER

BACKGROUND OF THE INVENTION

The present invention relates generally to a system for introducing a controlled gaseous mixture into an exposure chamber. More particularly, the present invention relates to a system for introducing a noxious gas into an exposure chamber containing plants which are to be exposed, under controlled conditions over long periods of time, to an atmospheric gas which is given a defined composition by the introduction of the noxious gas.

In such exposure chambers, climatic values and light are regulated electrically. The monitoring of operations and the introduction of the noxious gas is effected by means of a local computer network which monitors the chamber operation by means of a call service and regulates the introduction of noxious gas on the basis of a computer program. The desired functions and increased reliability must be realized by mechanical and electronic development. For example, it must be assured that the service operator on duty or any other authorized worker, is able to monitor the system's status by way of a computer voice output. This mode of operation must be made secure against unauthorized access to the computer since the voice channel does not permit any type of input. Moreover, the data collected at various locations in the chamber system must be transferred by the computer disposed at that location via the local network to a large or main memory. The entire local network, including the main memory, the electronic components of the network and the computers, must be secured against loss of current by means of an instantaneous current supply.

The routine data for regulating and monitoring are generally written in by means of an optical bar graph reader. A dot matrix printer is used to set up a table which contains all of the customary code combinations. Special functions are put in by means of a parallelly connected teletypewriter. This device additionally keeps a protocol of the bar graph signals in uncoded script.

An EEPROM programming circuit connected to the computer compiles, from the input data, an EEPROM which is inserted into the control computer for the chamber operating device. Typographical errors and double inputs are eliminated. For the compilation of measured data and the emission of control signals, a programmable data logger forms the connection between the respective computer on location with the control and measuring signal transducers. The system monitoring program and the noxious substance regulating or controlling program are subdivided into small portions which the data logger can handle and which are transferred to the data logger by the respective network computer at the points in time required by the operating sequence.

In a data logger, a compact device, the analog/digital converter is switched to the built-in computer in such a manner that the attachment of a peripheral device customary with universal devices does not take place. The data logger is galvanically separated from the computer by means of optical couplers. Batteries assure 18 hours of operation in the case of a malfunction of the electrical mains. The built-in magnetic tape cassette station, the built-in printer and the manual operation keyboard permit autonomous operation if there is a computer malfunction or for other reasons.

To alarm the control station, the data logger triggers a "dead man" circuit at two-minute intervals. If no signal appears, an alarm is initiated in the control station. The person on watch then informs the duty personnel for the chamber operation.

All of the above described complicated monitoring measures require a reliable gas supply to the exposure chamber, particularly if atmospheric gas is mixed with noxious gas(es). Providing the gas for days and months from gas bottles in which the prepared gas mixture is contained would be impossible here, at least for economic reasons, because of the multitude of bottles required and the change of bottles connected therewith.

Providing the gases in bottles containing the gas in a 100% concentration and mixing them on location is fraught with almost unsurmountable technical difficulties. For experiments which require very small concentrations, these 100% gases are barely manageable with the required accuracy by the standard control devices. Additionally, usable uniformity is very difficult to attain with very small drops of gas.

If commercially available regulators are used, each electrical interference would result in a great danger to the experimental material.

SUMMARY OF THE INVENTION

It is now an object of the present invention to provide a gas mixing system which is useable for an exposure chamber of the above-mentioned type whereby a gas mixture can be realized which remains in effect over long periods of time even if operational malfunctions occur.

The above object is achieved according to the present invention by a system for introducing noxious gas into an exposure chamber containing plants which are to be exposed, under controlled conditions over long periods of time, to an atmospheric gas which has been given a defined composition by the introduction of the noxious gas, with the system comprising: separate inlet conduits for the noxious gas and for the atmospheric gas; a respective mass flow regulator connected in each inlet conduit; a respective shut-off valve connected in each inlet conduit downstream of the respective flow regulator; an electronic control circuit means for controlling the flow regulators to regulate the respective flows of the atmospheric and noxious gases to be mixed, and for jointly switching the shut-off valves between open and closed positions in response to input control signals; a premixer stage means, connected to each of the inlet conduits downstream of the shut-off valves, for homogeneously mixing atmospheric and noxious gases flowing through the respective inlet conduits; a buffer reservoir for the thus composed mixture of atmospheric and noxious gases connected to the outlet of the premixer stage means; and a computer controlled dosaging means, connected to the outlet of the buffer reservoir, for dosaging the mixture of atmospheric and noxious gases for the exposure chamber.

According to a feature of the invention, the control circuit means includes: a respective maximum pressure monitor disposed in each gas conduit upstream of the respective mass flow regulator for providing respective control signals; a min-max pressure monitor for monitoring the fill level of the buffer reservoir and for providing a further control signal; and logic circuit means, responsive to the control signals and including a delay circuit, for opening the shut-off valves before opening of the mass flow regulators.

According to a further feature of the invention the dosaging means includes: a further mass flow regulator connected between the outlet of the buffer reservoir and the inlet of the exposure chamber; a pair of potentiometers having a common drive, with one of the potentiometers being connected to actuate the further flow regulator and the other potentiometer being connected to provide a desired regulating value for the further flow regulator; and an alternating current drive motor connected to the common drive to selectively position the potentiometers.

Finally, according to still a further feature of the invention the premixer stage means includes: a cylindrical vessel having a common inlet for the gas inlet conduits at one of its ends and an outlet at its other end; a plurality of mesh grids disposed in the vessel between its inlet and its outlet, with these mesh grids having mesh widths which decrease in the direction of flow of the gases introduced into the vessel.

This particularly advantageous gas mixing device according to the invention permits the mixing of two or more gases in one storage vessel by means of mass flow regulators or controllers. For use in the exposure chamber of the type described above, one component is always air. The premixed or diluted gas is here obtained from the storage vessel by means of a further dosaging device which is based on a mass flow regulator. With such dosaging devices, it is possible to run the required daily program by computer as well as by manual operation.

Important parameters transferred into the computer are the values of a gas analyzer, which scans from chamber to chamber, and these values can used as regulating values.

BRIEF DESCRIPTION OF THE DRAWINGS

FIG. 3 shows a preferred embodiment of a circuit arrangement for the dosaging device of FIG. 1.

FIG. 4 is a sectional view of a preferred embodiment of the premixer of FIG. 1.

DETAILED DESCRIPTION OF THE PREFERRED EMBODIMENTS

Figure 1:
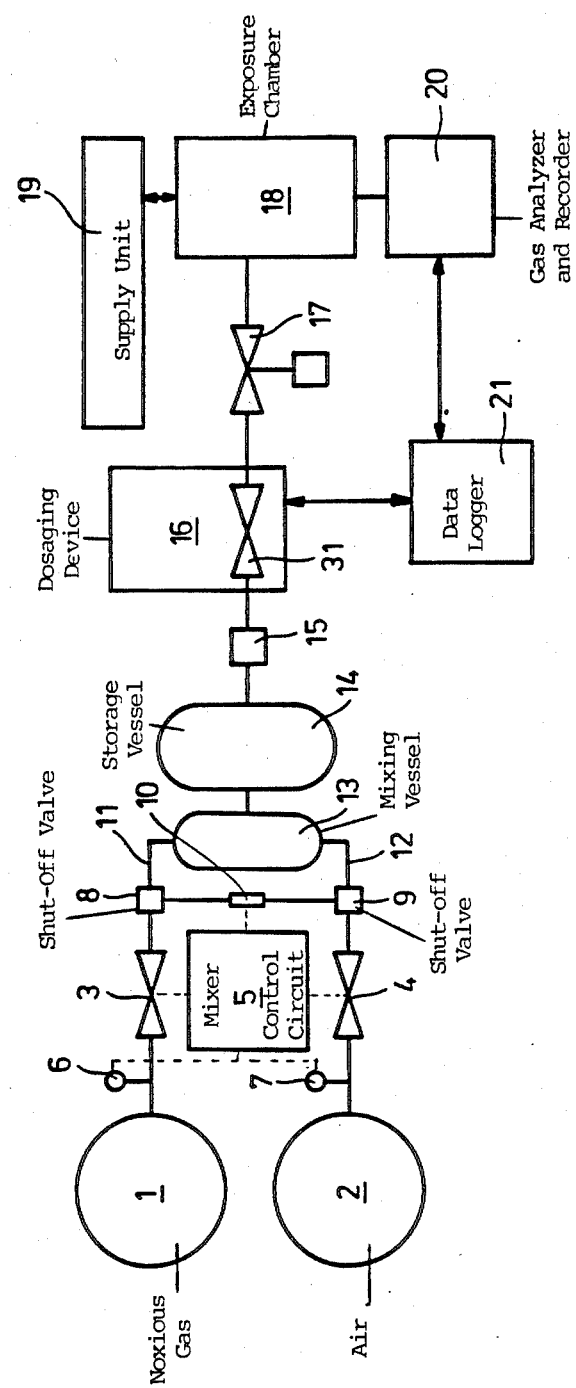
FIG. 1 is a schematic diagram showing the system according to the invention.

Referring now to FIG. 1, there is shown a gas mixing and introducing system according to the present invention wherein two gases from respective sources 1 and 2 are to be mixed with one another. Gas source 1 supplies, for example, a noxious gas such as CO, $NO_x$ or $SO_x$, while gas source 2 usually supplies atmospheric gas, i.e. air. The addition of the gas from source 1 occurs in the ppm range which constitutes a particular difficulty.

Figure 2:
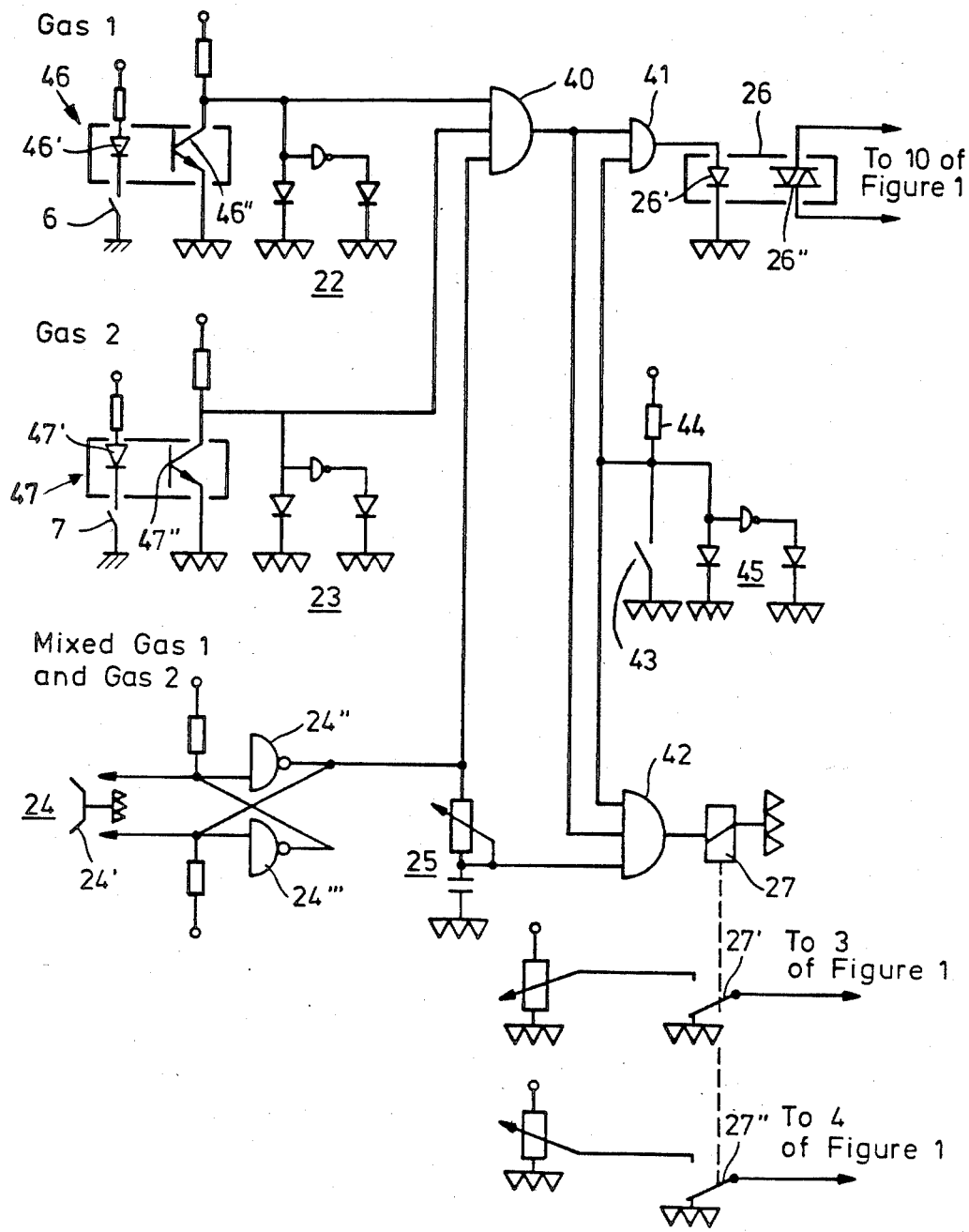
FIG. 2 shows a preferred embodiment of an electrical control circuit arrangement for the mixer of FIG. 1.

The masses or quantities of the two gases from sources 1 and 2 are regulated by means of respective mass flow regulators or controllers 3 and 4 which are controlled by an electronic mixer circuit 5 (FIG. 2). Each mass flow regulator 3 and 4 has an associated maximum pressure sensor 6 or 7 connected upstream of same in the respective gas input conduit 11 or 12, and a respective compressed air shut-off valve 8 or 9 connected downstream of same in the respective conduit 11 and 12. The shut-off valves 8 and 9 are operated with compressed air and are connected so that they are actuated simultaneously by means of a control member 10, e.g., a compressed air relay, which itself is controlled by the electronic mixer circuit 5. The downstream ends of the two input conduits 11, 12 are fed to a premixer 13 (see FIG. 4) which has an associated buffer reservoir 14 connected to its outlet. From this buffer reservoir 14, the mixed gas is fed serially through a reduction valve 15, a dosaging device 16 (see FIG. 3), which is equipped with a mass or quantity flow regulator 31, and a safety valve 17 into an exposure chamber 18. The dosaging device 16 assures constant mass or quantity removal (mass ratio removal) from the buffer reservoir 14. Also connected to the exposure chamber 18, as perpherial devices, are an environmental simulating climate supply unit 19, a gas analyzer and recorder 20, and a data logger 21. The mass flow regulators 3, 4 and 31 are of conventional design and, for example, are available from U.S. companies MKS Instruments Inc. or Tylan Corp.

In order to prepare the noxious gas or gases from source 1 for the regulating range of the dosaging device 16, they are predituled by means of the electronically or controlled regulated mixer arrangement including the components 3-10 of FIG. 1. For this purpose, the control circuit 5 preferably includes the electronic circuit according to FIG. 2 which permits the two gases to be mixed so that defined quantities of the two gases from sources 1, 2 are introduced into the mixing vessel 13 by mas flow regulators or controllers 3 and 4.

As shown in FIG. 2 each of the maximum pressure sensors 6 and 7, which are shown as respective switches, is connected to a respective optocoupler 46 or 47 in order to galvanically separate the pressure responsive switches 6 and 7 from the control circuitry connected to the outputs of the optocouplers. As shown, each of the optocoupler 46 and 47 includes a respective light emitting diode 46' or 47' electrically connected in series with a respective pressure responsive switch 6 or 7 across a source of voltage, and a respective light responsive transistor 46" or 47" connected across a further source of voltage. The output of each light responsive transistor 46" and 47" is connected to a respective indicator circuit 22 or 23, each including a pair of light emitting diodes connected in parallel via an inverter, and to a respective input of an AND-gate 40 whose output is connected to one input of each of further AND-gates 41 and 42. The other input of AND-gate 40 is connected to the output of a min-max pressure monitor 24, including a pressure responsive switch 24' and cross coupled inverter circuits 24" and 24''', which monitors the fill level in the mixing vessel 13. The output of the pressure monitor is also coupled via a delay circuit 25 to another input of AND-gate 42 whose output is connected to a relay 27 for jointly controlling the opening and closing of respective contacts 27', 27" and thus of the respective flow regulators 3 and 4. The remaining input of each of AND-gates 41 and 42 is connected to the output of gate enabling circuit including an on-off switch 43 connected in series with a resistor 44 across a source of voltage and an indicator circuit 45 for indicating the condition of the switch 43. In the illustrated open position of the switch 43, the voltage across the resistor 44, e.g. 5 volts, is applied to the respective inputs of the AND gates 41 and 42 to enable same, whereas closing the switch 43 will ground the respective inputs of the gates 41 and 42 and disable same. Finally, the output of AND-gate 41 is connected, via an optical relay 26 including a light emitting diode 26' and a light responsive bidirectional thyristor diode 26", to the compressed air relay or control member 10 which, as indicated above, controls the simultaneous opening and closing of the shut-off valves 8 and 9.

With the circuit of FIG. 2, if one of the two gases is missing, the respective maximum pressure monitor 6, 7, provided in each of the two incoming gas lines 11, 12 upstream of the mass flow regulator 3, 4, will emit a shut-off signal via the illustrated control circuit to the optical relay 26 for controlling the shut-off valves 8 and 9 and to the relay 27 for controlling the flow regulators 3 and 4. In a similar manner, an output signal from the min-max pressure monitor 24 can cause the switching of the valves 8 and 9 and the regulators 3 and 4. In the mixing arrangement according to the invention, each flow regulator or controller 3, 4 is provided with its own downstream connected respective compressed air shut-off valve 8 or 9 so as to cause the circuit release of the respective regulator valves 3, 4 and to assure the reliable shut-off of the conduits 11 and 12, respectively, if there is damage to the regulator or a current interruption. Moreover, the electronic delay member 25 in the control circuit ensures that the member 10 will switch valves 8, 9 before relay 27 has been switched, and thus opens mass flow regulator 3, 4 only after the joint switching of valves 8 and 9 has taken place. In this way the flow regulators 3 and 4, which react only to flowing gas, are prevented from tearing open completely and permitting a gas bubble under high pressure and of undefined composition to enter into the mixing vessel 13.

The central component of the electronic gas dosaging system 16 as shown in FIG. 3 is a dual potentiometer unit including individual potentiometers 28 and 28' connected to a common drive 30 which is connected to and moved by means of an alternating current drive motor 29 provided with an opening and closing optical load relay 32. Preferably, a manual setting button is disposed on the common drive axis 30 so as to indicate the potentiometer position and also to permit manual operation of the potentiometers 28 and 28' if necessary. The angular position of potentiometers 28 and 28' form the desired values for the mass flow controller or regulator 31 and for data logger 21, respectively. With this device, the desired electrical values from the computer system in data logger 21 ar stored mechanically. Consequently, malfunctions in the electrical mains and individual, unplanned current surges have practically no influence on this device and the spark formation usually encountered with collector motors is also eliminated.

The control signal from the data logger 21 applied at terminals 32' energizes the motor 29 for movement. The sense of direction of rotation of motor 29 is controlled by AC-currents supplied to motor terminals 29' and 29''' or 29'' and 29''' respectively. The signal corresponding to the position of the servo potentiometer 28' is fed back to the data logger 21 and is used to deenergize motor 29 when the desired value is reached. The signal corresponding to the position of the second potentiometer 28 actuates the mass flow regulator 31. Two separating amplifiers (not shown) are used to galvanically separate the actual value and the coil current. In addition to setting the actual value, the computer monitoring system also has available the actual signal from the regulator and the current flowing through the valve magnets. With suitable programming, this coil current furnishes a strong discrimination between various system and apparatus malfunctions for changes in flow through when compared with the desired and actual values over time.

Thus, the regulation in chamber 18 is not controlled by analog coupling with the gas analyzer 20, but rather by the computer via a separate data logger channel so as to maintain a firm control of the long-term behavior and possible malfunctions in analyzer 20 during unobserved operation.

Referring now to FIG. 4 there is shown a preferred embodiment of the premixer 13, which is composed of a cylindrical vessel into which opens a common inlet conduit 33 for the two inlet gas conduits 11 and 12. As see in the direction of gas flow, a plurality of transverse partitions 34 to 36 are successively inserted in the premixer vessel. The partitions 34 to 36 are composed of grids having a constant or preferably a decreasing mesh size, preferably 1.5 mm and 1 mm, in the direction of gas flow, and permit homogeneous mixing of noxious gas from source 1 (e.g. in the ppm range) with the gas from source 2 (e.g. air under atmospheric pressure). The premixer vessel is provided with a discharge conduit 37 for the mixed gas in the end of the cylindrical vessel opposite the inlet conduit 33, with this discharge conduit 37 leading to the buffer reservoir 14 (see FIG. 1). The number of mesh grids or partitions 34 to 36 is variable.

It will be understood that the above description of the present invention is susceptible to various modifications, changes and adaptations, and the same are intended to be comprehended within the meaning and range of equivalents of the appended claims.

What is claimed is:

1. A system for introducing noxious gas into an exposure chamber containing plants which are to be exposed, under controlled conditions over long periods of time, to an atmospheric gas which has been given a defined composition by the introduction of the noxious gas, said system comprising in combination:
   separate inlet conduits for the noxious gas and for the atmospheric gas;
   a respective mass flow regulator connected in each said inlet conduit;
   a respective shut-off valve connected in each said inlet conduit downstream of the respective said flow regulator;
   an electronic control circuit means for controlling said flow regulators to regulate the respective flows of the atmospheric and noxious gases to be mixed, and for jointly switching said shut-off valves between open and closed positions in response to input control signals;
   a premixer stage means, connected to each of said inlet conduits downstream of said shut-off valves, for homogeneously mixing atmospheric and noxious gase flowing through the respective said inlet conduits;
   a buffer reservoir for the thus composed mixture of atmospheric and noxious gases connected to the outlet of said premixer stage means; and
   a computer controlled dosaging means, connected to the outlet of said buffer reservoir, for dosaging the mixture of atmospheric and noxious gases for the exposure chamber.

2. A system as defined in claim 1 wherein said control circuit means jointly opens said mass flow regulators.

3. A system as defined in claim 2, wherein said control circuit means includes: a respective maximum pressure monitor disposed in each said gas conduit upstream of the respective said mass flow regulator for providing respective said control signals; a min-max pressure monitor for monitoring the fill level of said buffer reservoir and for providing a further said control signal; and logic circuit means, responsive to said control signals and including a delay circuit, for opening said shut-off valves before opening of said mass flow regulators.

4. A system as defined in claim 3 wherein said control circuit means further includes first control means for opening and closing said shut-off valves, and second control means for simultaneously actuating said mass flow regulators; and wherein said logic circuit means comprises: a first AND-gate having respective inputs connected to the outputs of said min-max pressure monitor and of each of said maximum pressure monitors; a second AND-gate having respective inputs connected to the output of said first AND-gate and to the output of an on-off enabling circuit, and having its output connected to the input of said first control means; and a third AND gate having respective inputs connected to said output of said first AND gate, to said on-off enabling circuit, and, via said delay circuit, to said output of said min-max pressure monitor, and having its output connected to the input of said second control means.

5. A system as defined in claim 4 further comprising: a respective optocoupler connected between each of said maximum pressure monitors and the respective said input of said first AND-gate; and an optical relay connected between the output of said second AND-gate and said input of said first control means.

6. A system as defined in claim 3, wherein said dosaging means includes: a further mass flow regulator connected between said outlet of said buffer reservoir an the inlet of the exposure chamber; a pair of potentiometers having a common drive, with one of said potentiometers being connected to actuate said further flow regulator and the other of said potentiometers being connected to provide a desired regulating value for said further flow regulator; and an alternating current drive motor connected to said common drive to selectively position said potentiometers.

7. A system as defined in claim 1 wherein said premixer stage means includes: a cylindrical vessel having a common inlet for said inlet conduits at one of its ends and an outlet at its other end; a plurality of mesh grids disposed in said vessel between said inlet and said outlet of said vessel, with said mesh grids having mesh widths which decrease in the direction of flow of the gases introduced into said vessel.

* * * * *